United States Patent [19]

Giannelli et al.

[11] 4,405,466

[45] Sep. 20, 1983

[54] BACKWASH METHOD AND APPARATUS

[75] Inventors: Joseph F. Giannelli, Glen Rock; George C. Flynn, Chester; Leo F. Ryan, Bridgewater, all of N.J.

[73] Assignee: Ecodyne Corporation, Chicago, Ill.

[21] Appl. No.: 374,350

[22] Filed: May 3, 1982

[51] Int. Cl.³ .............................................. B01D 29/38
[52] U.S. Cl. .................................. 210/798; 210/323.2; 210/333.01; 210/411
[58] Field of Search ............ 210/797, 798, 108, 323.2, 210/333.01, 333.1, 332, 411, 791, 792, 793, 794

[56] References Cited

U.S. PATENT DOCUMENTS

| | | | |
|---|---|---|---|
| 1,642,673 | 9/1927 | Genter | 210/797 |
| 1,771,928 | 7/1930 | Jung | 210/333.01 |
| 2,562,699 | 7/1951 | Cooperson et al. | 210/333.01 |
| 2,710,099 | 6/1955 | Kalinske | 210/323.2 |
| 3,280,978 | 10/1966 | Scott | 210/798 |
| 3,402,818 | 9/1968 | Sasaki | 210/411 |
| 3,438,502 | 4/1969 | Schmidt, Jr. et al. | 210/333.01 |
| 3,666,097 | 5/1972 | Ryan | 210/798 |
| 3,779,386 | 12/1973 | Ryan | 210/323.2 |
| 4,089,781 | 5/1978 | Asp | 210/797 |

Primary Examiner—Charles N. Hart
Assistant Examiner—John W. Czaja
Attorney, Agent, or Firm—Dressler, Goldsmith, Shore, Sutker & Milnamow, Ltd.

[57] ABSTRACT

The method and apparatus for filtering a liquid including a filter vessel divided into an upper filter compartment and a lower plenum compartment. An external vessel is positioned at or below the elevation of the tops of the filter element fittings in the plenum compartment. A pressurized gas is supplied to the upper portion of the external vessel forcing backwash liquid from the external vessel into the lower portion of the plenum compartment backwashing filter elements within the filter compartment.

11 Claims, 1 Drawing Figure

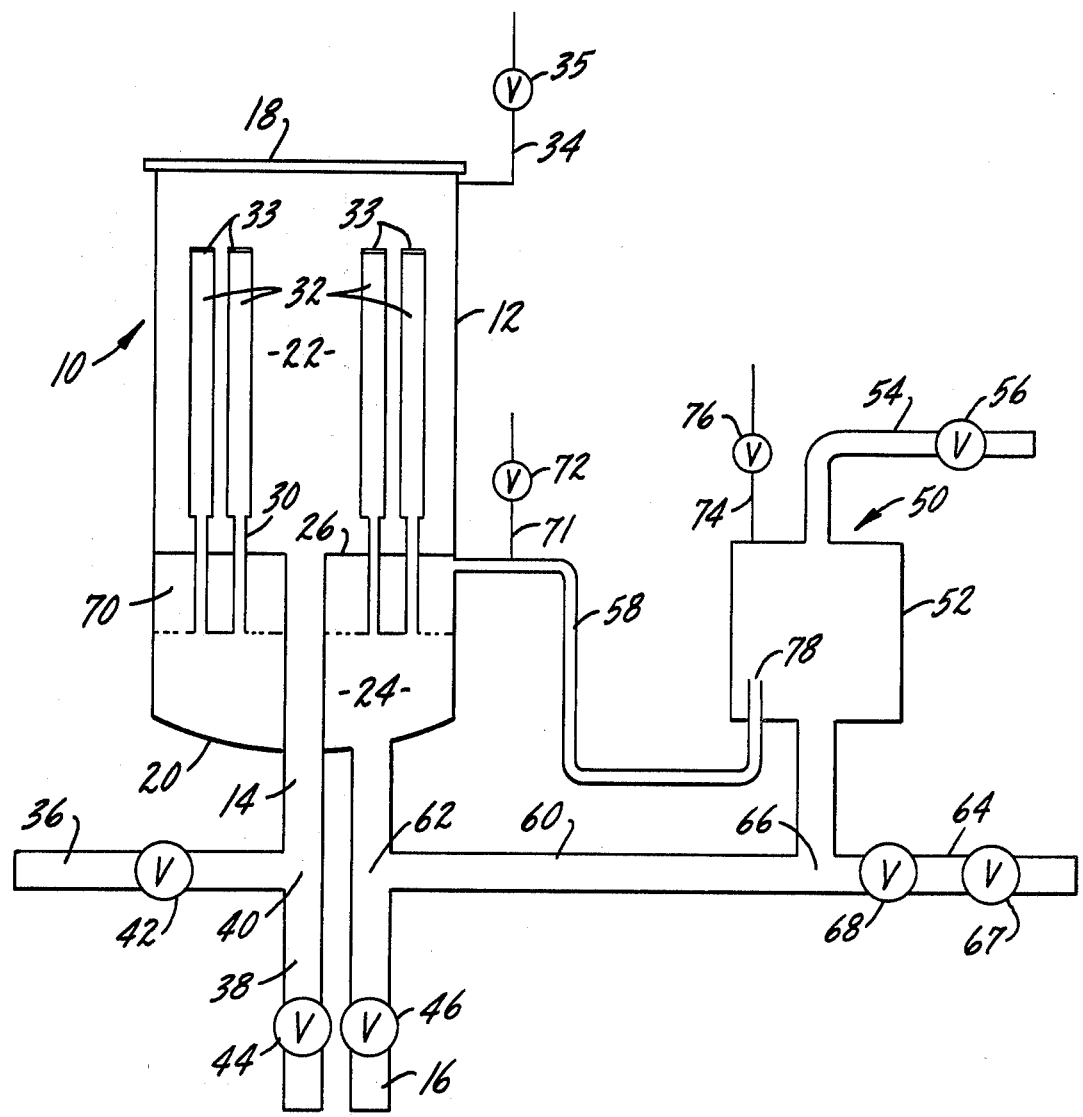

BACKWASH METHOD AND APPARATUS

BACKGROUND OF THE INVENTION

This invention relates to a method and apparatus for cleaning a plurality of filter elements which are vertically positioned within a filter vessel.

The method and apparatus in accordance with the invention is disclosed in conjunction with a specific filter apparatus which utilizes pre-coat type filter elements. It is contemplated that the invention may be similarly utilized in conjunction with other types of filter apparatus including filter apparatus which utilize non-pre-coat type filter elements.

It is known that liquids may be very effectively purified by passing them through a filter screen which has been pre-coated with a layer of particles, such as ion exchange resin particles. This method is disclosed in U.S. Pat. No. 3,250,703, issued May 10, 1966, and assigned to the same assignee of this application. Periodically, the layer of particles becomes exhausted and a filter cake builds up. It is then necessary to clean the filter in order to remove the particles so that they can be replaced with another layer of fresh particles, referred to herein as a "pre-coat" layer.

The filters normally employed are annular filter elements that are made of perforated metal or the like covered with a screen or with wool, cotton, nylon or other natural or synthetic material to form a relatively fine filter. The filter elements are typically positioned within a filter vessel and are secured to a tube sheet which divides the filter vessel into a filter compartment and a plenum compartment. There are generally two types of such filter apparatus which employ vertically positioned elements; one is of the down flow service water type which has the plenum compartment above the filter compartment, an example of such type is disclosed in U.S. Pat. No. 3,637,079, and the other is of the up flow service water type which has the plenum compartment below the filter compartment, an example of such type is disclosed in U.S. Pat. No. 3,666,097. The present invention is particularly directed to cleaning the filter elements in the latter type of filter apparatus.

It is the well known practice to clean the filter elements in a filter vessel of the up flow service type by use of a series of steps which include a series of backwash cycles which force a flow of cleaning liquid through the filter elements in the reverse direction of the service flow at high velocities. The high velocity may be imparted to the cleaning liquid by use of gas from a pressurized source. Such a backwash cycle is commonly known as a gas or air surge backwash cycle. The volume of cleaning liquid which is forced through the filter elements during each backwash cycle is approximately equal to the volume of cleaning liquid which is in the plenum compartment above the lower ends of the tube sheet fittings associated with the filter elements. In existing filter apparatus where the volume of the plenum area is fixed, and in newly designed filter apparatus where limitations are placed on the vessel length or tube sheet fitting length, the volume of cleaning liquid flow during each cycle is accordingly limited.

The present invention is based on the problem of finding a method and apparatus for cleaning filter elements which are supported within vessels having a bottom plenum volume which is not sufficient to contain the desired volume of cleaning liquid.

SUMMARY OF THE INVENTION

In accordance with the present invention, a method is provided for cleaning a plurality of filter elements, which are vertically positioned within a filter vessel having a tube sheet dividing the filter vessel into an upper filter compartment and a lower plenum compartment. The filter elements are positioned in the filter compartment and have corresponding tube sheet fittings which extend through the tube sheet downwardly into the plenum compartment. Briefly stated, the method includes the following steps: draining the liquid from the filter compartment; establishing a low flow rate of backwash liquid into the plenum compartment and through the filter elements; and intermittently cycling a predetermined volume of cleaning liquid at a high flow rate from an external volume under gas pressure into the plenum compartment and through the filter elements, followed by gas entering the plenum compartment and displacing liquid therein through the filter elements such that the total volume of cleaning liquid directed through the filter elements during each cycle is in the range of 1.0 to 3.0 times the total element core void volume of the filter elements.

More specifically, the method anticipates directing a portion of the cleaning liquid from the external volume through a gas surge line, in communication with a lower portion of the external volume and an upper portion of the plenum compartment above the elevation of the lower ends of the tube sheet fittings, and the remaining portion through a connecting line, in communication with a lower portion of the external volume and a lower portion of the plenum compartment below the elevation of the lower ends of the fittings. In accordance with the preferred form of the invention, the gas-liquid interface in the gas surge line reaches the plenum compartment before the gas-liquid interface in the connecting line reaches the plenum compartment so as to maximize the velocity of the cleaning liquid towards the filter element top caps. In its preferred form, the method further requires that the volume of cleaning liquid which is directed into the filter elements is equal to 0.2 to 0.8 times the total element core volume of the filter elements at such time as the gas-liquid interface in the gas surge line reaches the plenum compartment.

The apparatus of a preferred form of the present invention includes a filter vessel having a tube sheet dividing the vessel into an upper filter compartment and a lower plenum compartment. A plurality of vertical pre-coat filter elements extend upward from the tube sheet into the filter compartment. The filter elements have corresponding tube sheet fittings which extend through the tube sheet downwardly into the plenum compartment. An external pressure vessel is positioned outside of the filter vessel at an elevation at or below the elevation of the tops of the fittings. A gas supply line is provided in communication with an upper portion of the external vessel. A backwash liquid inlet line is provided in communication with a lower portion of the plenum compartment. A connecting line is provided in communication with a lower portion of the external vessel and a lower portion of the plenum compartment. A gas surge line is provided in communication with a lower portion of the external vessel and an upper portion of the plenum compartment above the lower ends of the tube sheet fittings. In a preferred form of the apparatus, the elevation of the end of the gas surge line is selectively adjustable within the external vessel. Further, the volume of the external vessel plus the volume of the plenum chamber above the lower ends of the tube sheet fittings minus the internal and material volumes of the tube sheet fittings within the plenum is equal to 1.0 to 3.0 times the total element core void volume of the filter elements.

BRIEF DESCRIPTION OF THE DRAWING

The invention, both as to its organization and method of operation, taken together with the objects and advantages thereof, will be best understood by reference to the following detailed description taken in conjunction with the accompanying drawing, in which the FIGURE is a schematic representation of a filter apparatus embodying the features of the present invention.

DESCRIPTION OF A PREFERRED EMBODIMENT

The method and apparatus of the present invention are described below in conjunction with the filter apparatus schematically illustrated in the FIGURE. It being understood that the present invention contemplates the use of alternative apparatus in practicing the teachings of the invention.

Referring to the FIGURE, the filter apparatus is generally indicated by reference numeral 10. The apparatus 10 includes a filter vessel 12 having an inlet line 14 and an outlet line 16. The filter vessel is a generally cylindrical vessel made of steel or the like, and having a flat or curved top 18 and an outwardly convex bottom 20. The vessel 12 is divided into an upper, influent or filter compartment 22 and a lower, filtrate or plenum compartment 24 by a tube sheet plate 26, suitably secured to the interior of the vessel 12 by welding or the like. The inlet line 14 extends through the bottom 20 of the vessel 12 and communicates with the filter compartment 22 so that all of the influent liquid passes directly to the filter compartment 22. The inlet pipe 14 is attached to the tube sheet plate 26 by welding or the like. In this manner, direct communication between the plenum compartment 24 and the filter compartment 22 is precluded. Although not shown in the FIGURE, a distributor plate is preferably mounted on the tube sheet plate above the inlet line 14. Such a distributor plate distributes liquid entering through the inlet line 14 radially outwardly into the filter compartment 22.

A plurality of tube sheet fittings 30 extend vertically through holes in the tube sheet plate 26 and are attached thereto by welding or other suitable means. The tube sheet fittings 30 are annular in shape, and are substantially parallel to the longitudinal axis of the filter tank 12, providing communication between the influent compartment 22 and the filtrate compartment 24. The fittings 30 have their upper ends suitably provided with means to receive filter cartridges (not shown). The fittings 30 have open lower ends which extend downwardly into plenum compartment 24.

Mounted vertically within the filter compartment 22 are a plurality of filter cartridges or elements 32 through which the influent liquid stream must pass before entering the filter compartment 24 and being discharged from the vessel 12 through the outlet line 16. The filter elements 32 are annular in shape and have a top cap indicated at 33. Examples of such filter elements are disclosed in U.S. Pat. No. 3,680,700, issued Aug. 1, 1972, and U.S. Pat. No. 4,269,707 issued May 26, 1981, both of which are assigned to the assignee of this application. The filter elements 32 have suitable mounting means (not specifically shown) for mounting the elements to the upper ends of corresponding fittings 30. Examples of such mounting means are disclosed in U.S. Pat. No. 4,174,282, issued Nov. 13, 1979, and U.S. Pat. No. 4,210,537, issued July 1, 1980, both of which are assigned to the assignee of this application. It will be understood that filter element construction and mounting means other than those described in the above patents may be used in the apparatus in accordance with the present invention, as is well known to those skilled in the art.

As shown in the FIGURE, a plurality of filter elements 32 are suitably spaced within the vessel 12 and suitably spaced from the sidewalls of the vessel 12. The top 18 of vessel 12 may be removably secured to the sidewalls of the vessel to permit the filter elements 32 to be placed into and removed from the filter vessel 12. A vent line 34 is provided through an upper portion of vessel 12, and is controlled by a vent valve 35.

As also shown in the FIGURE, the inlet line 14 is connected to a service inlet line 36 and a drain line 38 at a T-junction 40. Service inlet line 36 is controlled by valve 42 and drain line 38 is controlled by valve 44. Outlet line 16 is provided with a control valve 46.

The filter apparatus 10 of the present invention will normally be used to treat a stream of water, such as condensate water in the steam generating system of an electrical power plant. As those skilled in the art will understand, however, the filter apparatus 10 may be used to treat other liquids. In preparing the filter apparatus 10 for operation, the initial step is to pre-coat the filter elements 32. In order to accomplish this, the filter vessel 12 is filled with a low-impurity water, such as demineralized water. A slurry of pre-coat medium and demineralized water is prepared in a pre-coat tank. The pre-coat slurry is directed through the inlet line 14 into the filter compartment 22 of the filter vessel 12. The pressure of the incoming slurry forces the demineralized water in the filter compartment 22 through the filter elements 32 and out the filter vessel 12 via the plenum compartment 24 and the outlet line 16 and back into the pre-coat tank. The pre-coat material is retained on the outer surface of the filter elements 32. After virtually all of the pre-coat material is deposited on the elements 32, the pre-coating cycle is complete. The thickness of the pre-coat layer varies, but it is preferably in the range of about one-eight to one inch. The filter apparatus 10 is now ready to treat feed water. Reference is made to the disclosure in U.S. Pat. No. 3,666,097, issued May 30, 1972, for a more detailed description of the pre-coat cycle.

In operation of filter apparatus 10 during the service cycle, valves 35 and 44 are closed and valves 42 and 46 are opened. In this manner, untreated water enters the filter vessel 12 through the inlet line 14 to the filter compartment 22. The pressure of the incoming untreated water forces it through the resin pre-coat layer, the filter elements 32, and the plenum compartment 24 into the outlet line 16. As the untreated water passes through the pre-coat layer, an ion exchange reaction takes place to remove dissolved impurities from the water. In addition, undissolved impurities are removed from the untreated water by virtue of the water passing through the pre-coat layer of finely divided ion exchange resin particles and filter element 32. A filter cake, consisting of undissolved impurities, builds up within and on the pre-coat layer as the service cycle continues. The purified or treated water flows through the filter compartment and the outlet line 16 to a suitable service line (not shown) for use. As is well known in the art, the pre-coat material may contain various combinations of reactive materials, such as ion exchange resins, activated carbon etc., and non-reactive materials.

Eventually, the pre-coat will become exhausted and must be regenerated or discarded. At such time, the filtering or service cycle is stopped by closing valve 42. It is now necessary to clean the filter elements 32, by removing the filter cake and the pre-coat layer therefrom, before the filter elements 32 are pre-coated and the filter apparatus 10 returned to service. The present invention is particularly directed to a method and apparatus to optimize the effectiveness of this cleaning cycle.

Referring once again to the FIGURE, a preferred embodiment of the cleaning or backwash system is illustrated, indicated generally at 50. Backwash system 50 includes an external vessel or tank 52 positioned externally of filter vessel 12. Vessel 52 is positioned relative to filter vessel 10 such that the upper extremities thereof are at or below the elevation of the tops of fittings 30. A gas inlet line 54 is provided in communication with an upper portion of vessel 52. Gas inlet line 54 is in communication with a source of pressurized gas (not shown) and is controlled by a quick opening and closing valve 56. A small diameter gas surge line 58 is provided having a first open end in communication with a lower portion of vessel 52 and a second open end in communication with the plenum compartment 24 at a point immediately below tube sheet plate 26 and above the open ends of fittings 30. A large diameter connecting line 60 is provided having a first open end in communication with a lower portion of vessel 52 and second open end in communication with outlet line 16 at T-junction 62 above valve 46. In a typical installations having filter areas of roughly 800 ft² to 1700 ft² per vessel, three gas surge lines, each with an internal diameter of approximately two inches, are attached to a vessel quadrant. One to four quadrants can have this gas surge pipe configuration. The connecting line typically has an internal diameter of approximately eight to sixteen inches. A backwash liquid inlet line 64 is provided having a first end in communication with a source of backwash liquid (not shown) and a second end in communication with an intermediate section of connecting line 60 at T-junction 66. A control valve 67 and a non-return valve 68 are provided in backwash liquid inlet line. A plenum vent line 71 and associated valve 72 are provided in gas surge line 58 and an external vessel vent valve 74 and associated valve 76 are provided at an upper portion of vessel 52.

The discussion of the operation of backwash system 50 which herebelow follows describes the operation of the system and discloses certain novel relationships and operating conditions which form an important part of the present invention.

At the initiation of the cleaning or backwash cycle, the filter compartment 22, the plenum compartment 24 and the vessel 52 are full with liquid. The backwash cycle is initiated by opening vent valve 35, drain valve 44, and backwash inlet valve 67. Liquid is partially or fully drained from the filter compartment 22. During the drain step, backwash liquid is periodically or continuously introduced at a low flow rate through line 64, line 60, line 16 into plenum 24 and then through fittings 30 and up through filter elements 32 in the reverse direction to normal flow. The low flow rate of backwash flow during the drain step and the subsequent cleaning step is effective to aid in the removal of the spent resin and crud from filter compartment 22. Upon completion of or during the drain step a gas surge backwash step is initiated to remove the pre-coat layer, together with the remaining constituents of the filter cake, from the filter elements 32. After the gas surge step it is preferable to maintain the low flow rate of backwash liquid into filter compartment 22 to aid in the removal of the dislodged material from filter compartment 22 through the drain line 38. Each backwash cycle consists of a series of gas surge backwash steps.

To aid in the description of the gas surge backwash steps and the discussion of the various novel relationships and operating conditions, the definition of certain terms is necessary. The term "available plenum liquid volume" is defined as the net volume of liquid which is displaced from the plenum compartment 24 during each gas surge backwash step, excluding the liquid contained within the tube sheet fittings 30. The available plenum liquid volume is defined as the volume of liquid in the plenum compartment 24 which is above the elevation of the lower ends of fittings 30, excluding the volume of liquid in the fittings 30, and is indicated at 70. The term "external volume" is defined as a liquid holding volume located external to the filter vessel 12. In accordance with the preferred embodiment, the external volume is the volume of liquid in vessel 52. However, the present invention anticipates that an expanded section of pipe, i.e. connecting pipe 60, may serve as the external volume. The term "total liquid surge volume" is defined as the sum of the available plenum liquid volume plus the external volume. The term "total element core void volume" is defined as the total void volume of the inner cores of the filter elements 32.

With valves 42 and 46 closed and valve 35 open, the initial gas surge backwash step is initiated by opening valve 56 on gas line 54 to direct pressurized gas into vessel 52. The pressurized gas rapidly displaces the cleaning liquid contained in vessel 52, the gas surge line 58, the available plenum volume 70, and some of the liquid contained in connecting line 60. The cleaning liquid flows at high velocities through the tube sheet fittings 30 and the interior of filter elements 32, and then out through the surface of the filter elements 32. This rapid movement of cleaning liquid through the filter elements 32, in the reverse direction of service flow, is effective to clean the surfaces of the filter elements 32. The quick opening valve 56 remains open for a predetermined period of time, after which it is closed. The factors determining the length of time which valve 56 remains opened during each step is hereinbelow further discussed. After completion of each backwash step, the vent valves 72 and 76 are opened to permit the backwash liquid from line 64 to replenish the liquid in vessel 52, the available plenum liquid volume 70 and the lines 58 and 60. Gas escapes through vent lines 70 and 74, or other venting means which may be provided. The vent valves 72 and 76 are then closed and the system is ready for the next backwash step. The aforementioned backwash step is repeated a sufficient number of times to thoroughly clean the filter elements 32, typically one to ten backwash steps are necessary. During subsequent backwash steps, it may be desirable to partially fill the filter compartment 22 with backwash liquid by closing valve 44, immediately prior to the initiation of the next backwash step. By so doing, turbulence is created within compartment 22 which helps to break up large chunks of materials and facilitate the removal thereof from the vessel 10 through lines 14 and 38.

After the filter elements 32 have been thoroughly cleaned, the filter compartment 22 is drained for the last time. The external vessel 52, the plenum compartment 24 and the filter compartment 22 are then filled with liquid, such as demineralized water, prior to initiating the pre-coating procedure as hereinabove described.

The cleaning of the filter elements 32 is attained by the rapid displacement of the available plenum liquid volume through the elements. It has been discovered that a critical relationship or ratio exists between the total liquid surge volume to the total element core void volume and the degree of cleaning with the gas surge backwash. Specifically, an available plenum liquid volume to total element core void volume ratio of 1.0 to 3.0, and specifically from 1.5 to 3.0, are needed to thoroughly clean the filter elements and extend the run lengths of the apparatus during the service cycle. If the available plenum liquid volume is less than the critical volume, it has been experienced that complete filter element cleaning is not attained regardless of the liquid velocities of the cleaning liquid through the elements. Further, it has been experienced that if the available plenum liquid volume is much greater than the critical volume, the size of plenum compartment 24 and/or the size of external vessel 52 becomes excessively large and costly, and the beneficial release of gas through the elements following the high rate liquid flow may be prevented.

It has further been determined that it is preferable that the gas-liquid interface through the gas surge line 58 reach the bottom of the fittings 30 in the plenum compartment 24 prior to the time at which the gas-liquid interface through the connecting line 60 reaches the plenum compartment 24. In this manner, the velocity of the cleaning liquid columns moving upward through the cores of the filter elements 32 is maximized as the liquid impacts on the top caps 33 of the elements 32. The position of the gas-liquid interface in the connecting line 60 at the time when the gas entering the plenum compartment 24 through the gas surge line 58 reaches the bottom of the fittings 30 in the plenum compartment 24 can be controlled by the extent to which the end 78 of gas surge line 58 extends upward into vessel 52. Accordingly, it is desirable that the end 78 of gas surge line 58 be provided with means to selectively adjust the height thereof in vessel 52. For example, an adjustable collar (not shown) can be provided about the end 78 of gas surge line 58.

It has even further been determined that to ensure maximum cleaning effectiveness of the filter elements 32, it is desirable to rapidly fill the cores of the elements 32 with cleaning liquid to a level below the tops of the elements 32 prior to the time when the gas-liquid interface in the gas surge line 58 reaches the plenum compartment 24. The extent to which the cores of the elements 32 are filled prior to this time depends on the available plenum liquid volume in the vessel 12. To ensure maximum cleaning effectiveness, the following two criteria should be met:

1. The sum of the volume of cleaning liquid forced into the cores of the elements 32 prior to gas entering compartment 24 and the available plenum liquid volume should be greater than 1.0 times the total element core void volume.
2. The cores of the elements 32 should not be completely filled with cleaning liquid at the time when gas starts to enter the plenum compartment 24 through the gas surge line 58.

Applying these criteria to a given available plenum liquid volume, there is a Minimum Liquid Volume which should be forced through the fittings 30 to rapidly fill the cores of the elements 32 prior to gas entering the vessel plenum through the gas surge pipe 58. Some examples, along with practical design values for this Initial Rapid Fill of the cores of the elements 32, are given below:

| Ratio of Available Plenum Liquid Volume To Total Element Core Void Volume (dimensionless) | Initial Rapid Fill | |
|---|---|---|
| | Minimum Liquid Volume To Total Element Core Void Volume (dimensionless) | Practical Design Liquid Volume To Total Element Core Void Volume (dimensionless) |
| 0.2 | 0.8 | 0.9–0.95 |
| 0.4 | 0.6 | 0.8–0.9 |
| 0.6 | 0.4 | 0.6–0.9 |
| 0.8 | 0.2 | 0.4–0.9 |

The practical design values for the initial fill of the cores of the elements 32 compensate for cleaning liquid which is not retained within the element cores in the initial fill step and, in general, provide a safety factor in achieving a successful design. In summarizing the above, at the time when the gas-liquid interface in the gas surge line 58 reaches the plenum compartment 24, the volume of cleaning liquid forced into the cores of the elements 32 is preferably in the range of 0.2 to 0.8 times the total element core void volume depending upon the available plenum liquid volume in the vessel 12.

The above described method and apparatus in accordance with the present invention solves a long known problem of in-situ cleaning of filter elements used as filter or pre-coat supports for the removal of contaminants from liquids. The method and apparatus of the present invention provides a means to effectively clean such filter elements in filter vessels which have available plenum liquid volumes which have heretofore been deficient for complete element cleaning with conventional gas surge backwash procedures. The invention recognizes the range of the critical ratio of the total liquid surge volume to the total element core void volume and provides a means to achieve such ratios without materially increasing the size of the filter vessel. In addition, the system maximizes the velocity of the cleaning liquid as it impacts on the top caps of the filter elements. The two lines which connect the external vessel 52 with the plenum compartment 24, the gas surge line 58 and the connecting line 60, serve to maximize the velocity and the volume of the cleaning liquid delivered through the filter elements. An extension associated with the gas surge line 58 provides a means for the control of the gas-liquid interface created by gas flow through the gas surge line 58. This permits control of the various design criteria which are required to thoroughly clean the filter elements and thereby extend run lengths.

Although the method and apparatus of the present invention has been discussed primarily in connection with apparatus utilizing pre-coat filter elements, it may likewise be used with apparatus utilizing non-pre-coat filter elements, as will be understood by those skilled in the art.

Obviously, many modifications and variations of the present invention as hereinbefore set forth will occur to those skilled in the art, and it is intended to cover in the appended claims all such modifications and variations as fall within the true spirit and scope of the invention.

What is claimed is:

1. A method for cleaning a plurality of filter elements having inner cores vertically positioned within a filter vessel which has a tube sheet dividing the filter vessel into an upper filter compartment and a lower plenum compartment, said filter elements being positioned within said filter compartment and having fittings which extend through said tube sheet downwardly into said plenum compartment, said method comprising: draining at least a portion of the liquid from the filter vessel, establishing a low flow rate of backwash liquid through a backwash inlet line into the plenum compartment continuing through the filter elements; and intermittently directing gas under pressure through a gas supply line in communication with an external vessel containing a volume of cleaning liquid for forcing a predetermined volume of the cleaning liquid from the external vessel under gas pressure at a high flow rate into the plenum compartment and through the filter elements such that the total volume of cleaning liquid directed through the filter elements during each cycle is in the range of 1.0 to 3.0 times the total filter element core void volume.

2. The method as defined in claim 1 wherein the volume of cleaning liquid is intermittently cycled through the filter elements a plurality of times.

3. The method as defined in claim 1 wherein each cycle of cleaning liquid lasts in the range of one to six seconds.

4. The method as defined in claim 1 wherein a portion of the volume of cleaning liquid cycled from the external vessel is directed through a gas surge line in communication with a lower portion of the external vessel and an upper portion of the plenum compartment above the elevation of the lower ends of the fittings and the remaining portion of the volume of cleaning liquid cycled from the external vessel is directed through a connecting line in communication with a lower portion of the external vessel and a lower portion of the plenum compartment such that a gas-liquid interface in the gas surge line reaches the plenum compartment before a gas-liquid interface in the connecting line reaches the plenum compartment.

5. The method as defined in claim 4 wherein the volume of cleaning liquid which is directed through the filter elements during each cycle is equal to 0.2 to 0.8 times the total filter element core void volume at such time as the gas-liquid interface in the gas surge line reaches the plenum compartment.

6. The method as defined in claim 4 wherein the level of liquid within the cores of the filter elements during each cycle is below the tops of the filter elements at such time as the gas-liquid interface in the gas surge line reaches the plenum compartment.

7. The method as defined in claim 6 wherein the sum of the volume of liquid directed into the filter element cores prior to the gas-liquid interface in the gas surge line reaching the plenum compartment plus the available plenum liquid volume in the plenum compartment is at least 1.0 times the total filter element core void volume.

8. Apparatus for filtering liquids comprising: a filter vessel; a tube sheet dividing said vessel into an upper filter compartment and a lower plenum compartment; a plurality of filter element fittings extending through said tube sheet and downwardly into said plenum compartment; a plurality of filter elements vertically mounted on said fittings in said filter compartment; an external vessel positioned outside of said filter vessel at an elevation at or below the elevation of the tops of said fittings; a gas supply line in communication with an upper portion of said external vessel; a backwash liquid inlet line in communication with a lower portion of said plenum compartment and a lower portion of said external vessel; and a gas surge line in communication with a lower portion of said external vessel and an upper portion of said plenum compartment.

9. The apparatus as defined in claim 8 wherein the elevation of one end of said gas surge line is selectively adjustable within said external vessel.

10. The apparatus as defined in claim 8 wherein the volume of said external vessel plus the volume of said plenum chamber above the lower ends of said fittings minus the internal and material volume of said fittings is equal to 1.0 to 3.0 times the total filter element core void volume.

11. The apparatus as defined in claim 10 wherein the diameter of said gas surge line is substantially smaller than the diameter of said backwash line.

* * * * *